United States Patent [19]
Faulkner et al.

[11] 3,983,309
[45] Sept. 28, 1976

[54] PRIMARY ELECTRODE ARRANGEMENT FOR HIGH TEMPERATURE MELTING FURNACE

[75] Inventors: Duane Harold Faulkner, Cambridge City; Steven Douglas Sanford, Richmond, both of Ind.; Vaughn Charles Chenoweth, Hollansburg, Ohio

[73] Assignee: Johns-Manville Corporation, Denver, Colo.

[22] Filed: May 16, 1975

[21] Appl. No.: 578,439

[52] U.S. Cl. .......................... 13/6; 13/23
[51] Int. Cl.² ........................... C03B 5/02
[58] Field of Search ....................... 13/6, 23

[56] References Cited
UNITED STATES PATENTS

| | | |
|---|---|---|
| 2,978,526 | 4/1961 | Olson .................... 13/6 X |
| 3,354,256 | 11/1967 | Vaughan et al. ............ 13/23 |
| 3,402,249 | 9/1968 | Blumenfeld et al. .......... 13/6 |
| 3,539,691 | 11/1970 | Lucek .................... 13/6 |
| 3,580,976 | 5/1971 | de Bussy ................. 13/6 |

*Primary Examiner*—R. N. Envall, Jr.
*Attorney, Agent, or Firm*—Robert M. Krone; Joseph J. Kelly; John H. Miller

[57] ABSTRACT

Prior art high temperature electric furnaces of the type using two or more, usually three, primary electrodes positioned around an electrically conducting central outlet brought the electrodes in through a side or bottom wall of the furnace at points below the melt line causing many problems. The present invention provides a primary electrode arrangement for such melting furnaces wherein the primary electrodes do not pass through the wall or bottom of the furnace below the melt line, but instead enter the furnace over the top of the melt line and then protrude through the top surface of the melt. The primary electrodes of the present invention are provided with means for preventing wear and deterioration at the interface between the top surface of the melt and the unmelted batch and/or the oxidizing air atmosphere surrounding the top of the furnace. The improved furnace of the present invention does not require the use of a purging neutral or reducing atmosphere to protect the primary electrodes.

10 Claims, 9 Drawing Figures

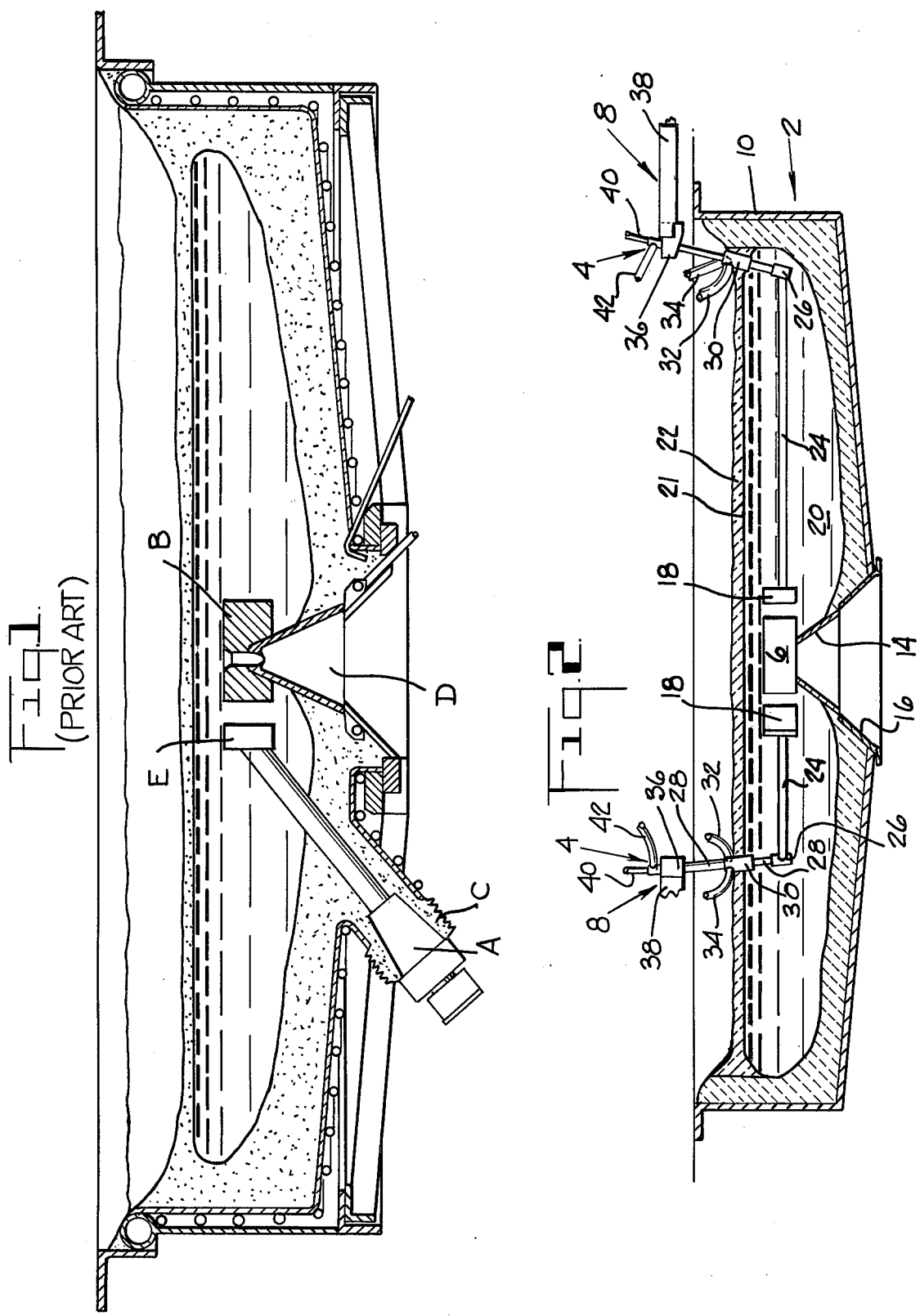

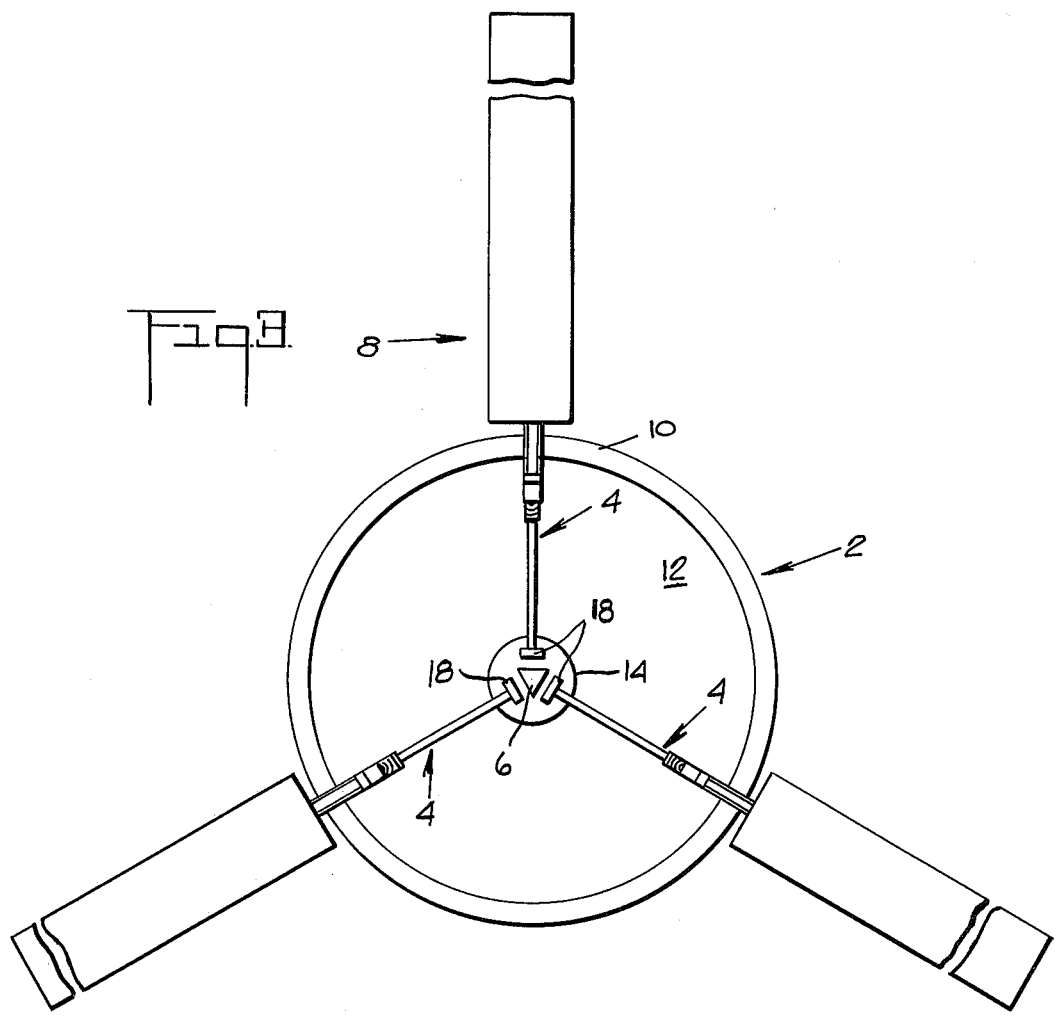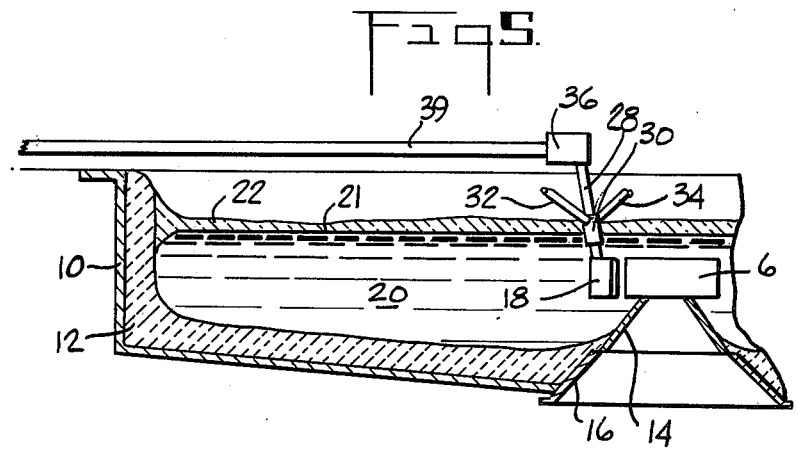

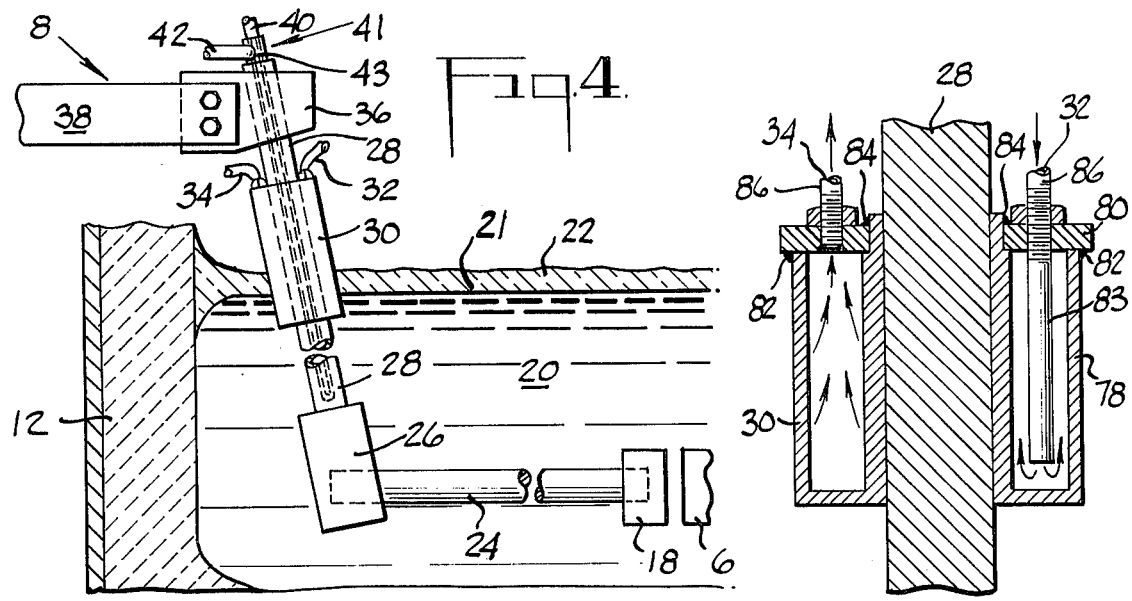
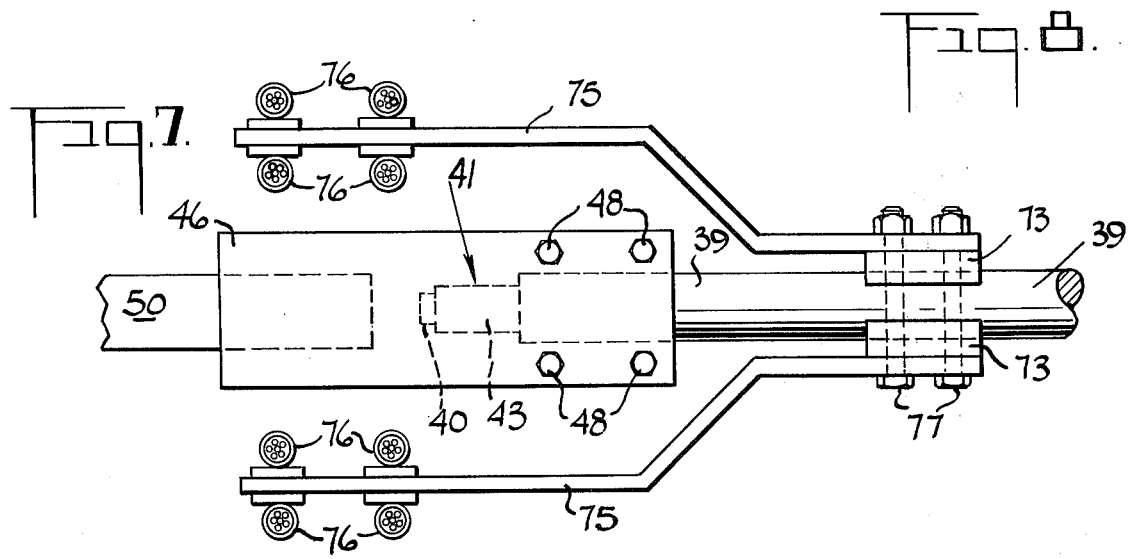
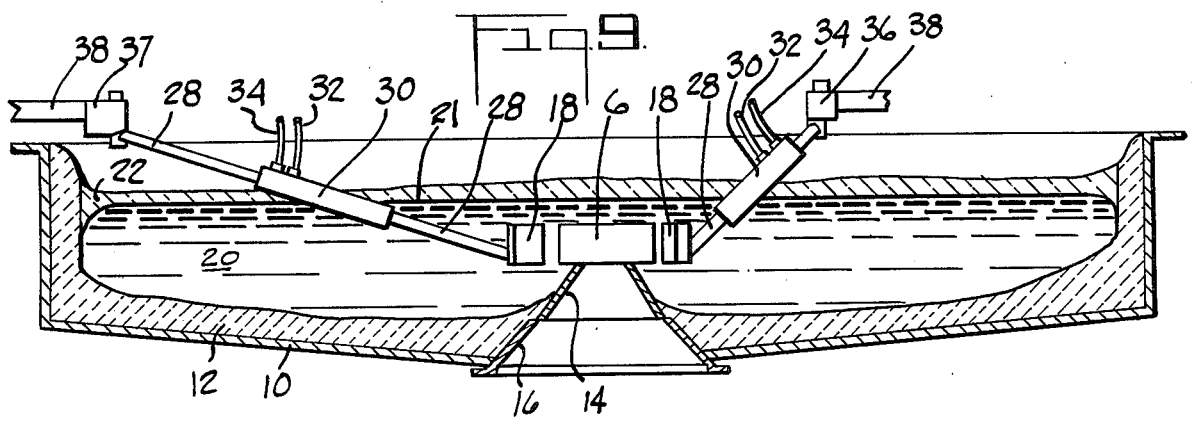

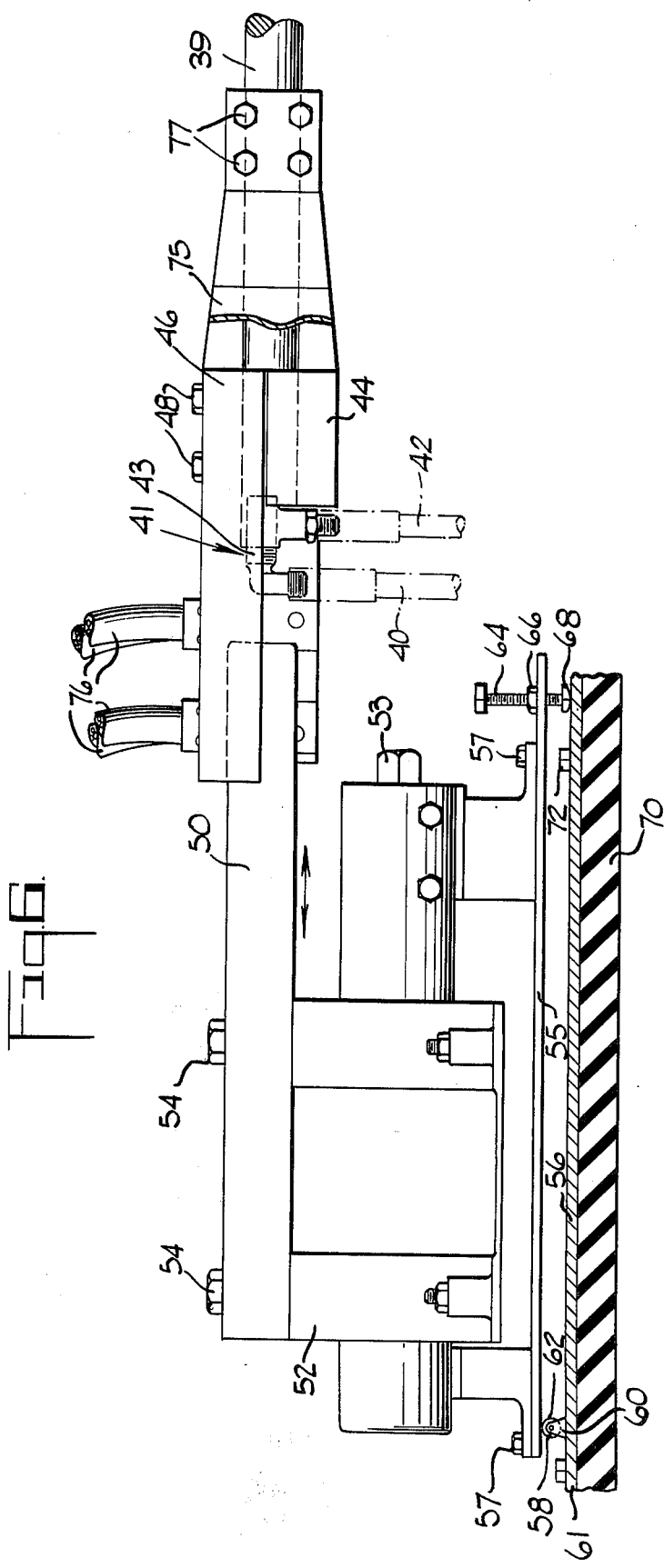

PRIMARY ELECTRODE ARRANGEMENT FOR HIGH TEMPERATURE MELTING FURNACE

This invention relates to electrical high temperature melting furnaces having at least two primary electrodes, usually three, whose tips surround an electrically conducting outlet member, which outlet cooperates with the electrode tips and the primary electrodes to form a three-pointed star current flow pattern for melting materials such as glass, slags, refractory compositions, etc.

BACKGROUND OF THE INVENTION

Electrical high temperature melting furnaces of the general type shown in FIG. 1 are well known in the art as evidenced by U.S. Pat. No. 3,659,029 and the references cited therein including U.S. Pat. No. 3,580,976 and Russian Pat. No. 129,311. Generally, these furnaces utilize three electrodes A, (only one is shown in FIG. 1), spaced around an outlet member B, that also acts as an electrical conducting member cooperating with the tips of the three electrodes to form a three-pointed star current flow pattern. In most of the prior art devices it has been necessary to flood the outlet D and the electrode inlets C with an inert gas, or a reducing gas such as hydrogen, to prevent deterioration of the outlet and the electrodes, which usually are made of a refractory metal such as molybdenum, tantalum, or tungsten.

An undesirable feature of these types of prior art furnaces is that the primary electrodes were mounted such that they passed through sidewalls or the bottom of the furnace below the melt line. This electrode mounting technique requires a complex and costly furnace shell and refractory lining to accommodate the primary electrodes. Further, it requires areas that, if not insulated very precisely, can short out the electrodes and melt or warp the metal furnace shell. Also, good seals in the inlets C are required to prevent leakage of air into and around the electrodes from outside the furnace that would oxidize and shorten the electrode life, and to prevent the molten contents of the furnace from leaking out around the electrodes. As a result, and since the electrodes usually wear out before the refractory wall, changing electrodes requires interrupting the operation for substantial times to cool down the furnace, remove the damaged electrodes, and install new electrodes. Changing of the electrodes also can damage the electrical insulation between the electrodes and the shell.

Further, the optimum spacing of the electrode tips E from the outlet member B changes as the electrode tips wear which require that the electrode tips be moved in towards the center of the furnace periodically during the life of the primary electrodes. Making these adjustments has proved difficult with the prior art primary electrode mounting systems because with these systems if the primary electrodes are moved too far in towards the center they cannot be readily pulled back to the proper position.

While it has been known to use starting electrodes that do not pass through the furnace wall below the melt line, as evidenced by French Pat. No. 1,206,771 and U.S. Pat. No. 3,147,328, these furnaces still possess primary electrodes that pass through the furnace wall. These starting, or dipping electrodes, were used in these furnaces only during start up and were removed as soon as the material in the furnace was sufficiently melted between the primary electrode tips because these starting electrodes tended to wear very rapidly at the interface between the top of the molten glass pool and the air or unmelted batch. Thus, these electrodes were removed as soon as a sufficient current flow was obtained between the primary electrode tips.

The object of the present invention is to avoid the problems associated with bottom or below the melt line wall mounted primary electrodes by mounting specially designed electrodes in a different manner.

Another object of the invention is to provide a primary electrode arrangement that does not require flooding with a neutral or reducing gas to protect the electrodes from oxidation, and one in which the primary electrodes are easy to adjust and remove or replace without cooling down the furnace.

Still another object of the invention is to provide a primary electrode arrangement that increases the life of the electrodes as compared with the prior art and eliminates the danger of electrical shorts between the primary electrodes and the metal furnace shell.

BRIEF SUMMARY OF THE INVENTION

Accordinly, the present invention provides a melting furnace comprising a vessel for containing molten material, an electrically conducting member located inside said vessel, an outlet member for extracting molten material therethrough, and at least two primary electrodes disposed such that their tips are inside said vessel below the melt line and spaced radially about said electrically conducting member, the improvement comprising primary electrodes that are shaped and mounted in such a manner that they do not pass through a wall or the bottom of said vessel at a point below the melt line, a portion of each of the primary electrodes being submerged in molten material in the vessel and a portion of each of the primary electrodes being exposed through the top surface of the molten material to the environment adjacent to the top surface of the molten material, each primary electrode having means located at and near the melt line, i.e., where the primary electrode passes through the top surface of the molten material, for preventing oxidation of the electrode. Preferably, the means for preventing deterioration of the electrode at and near the melt line comprises cooling means for keeping the surface of the electrode in that area below the temperature at which it will be rapidly oxidized. Such a cooling means provides the needed protection while allowing the remainder of the electrode below the melt line to be much hotter thus providing for the optimum energy efficiency.

BRIEF DESCRIPTION OF THE DRAWINGS

FIG. 1 is a cross section of a typical prior art furnace of the type dealt with by the present invention.

FIG. 2 is a cross section of one embodiment of the present invention.

FIG. 3 is a plan view of the embodiment shown in FIG. 2.

FIG. 4 is an enlarged view of a portion of the embodiment shown in FIG. 2 and better showing one of the primary electrodes.

FIG. 5 is a partial cross section of another embodiment of the present invention.

FIG. 6 is an elevational view of the apparatus used to mount and support the primary electrodes in the present invention with a portion removed for better illustration.

FIG. 7 is a plan view of a portion of the apparatus shown in FIG. 6 and better shows how electrical energy is fed to the primary electrodes.

FIG. 8 is an enlarged cross section of the primary electrode melt line vicinity cooling means shown in FIGS. 2, 5, and 9.

FIG. 9 is a cross section of still another embodiment of the present invention.

DETAILED DESCRIPTION AND PREFERRED EMBODIMENTS

Referring to FIGS. 2 and 3, the furnace of the present invention is comprised of a container for molten material 2, a plurality of primary electrodes 4, an electrically conducting outlet number 6, and electrode mounting means 8. The container for the molten material comprises an outer metal shell 10 which can be water cooled by any conventional manner, particularly when melting materials at a temperature above 2000°F. The metal shell 10 is lined with a layer of suitable refractory material 12 compatible with the material being melted in the furnace. The electrically conducting outlet 6 is supported in the proper position by a metallic cone 14 preferably made of a refractory metal like molybdenum, tungsten, or tantalum. This metallic cone is in turn supported by a water cooled metallic lower cone 16, usually made of a high heat conductive material such as copper.

The primary electrodes 4 shown in FIGS. 2 and 3 are comprised of an electrode tip 18, usually in the form of a plate, to which is threaded or welded a generally horizontal lower electrode rod or arm 24, preferably round in shape, an elbow 26 into which rod 24 is threaded, welded, or otherwise connected and also into which an upper, generally vertical, electrode rod or arm 28 is connected in a similar manner. The primary electrode tip 18 and the electrode rods 24 and 28 are made of a material having good electrical conductivity, preferably from a refractory metal material like molybdenum, tungsten, tantalum, or alloys thereof. The upper portion of the primary electrode rod 28 is connected to the electrode mounting means through an elbow 36, preferably copper, by any suitable conventional clamping or bolting means. The upper electrode rod 28 is cooled along a portion of its length to prevent oxidation above the melt line 21, preferably by feeding cooling fluid such as water to an inlet 40 and removing the cooling fluid through an outlet 42. A suitable structure for this cooling will be described in more detail later with respect to FIG. 4. Also located on the upper electrode arm 28 is a means for maintaining the electrode arm below a critical oxidation temperature in the vicinity of the melt line 21, which includes the unmelted batch 22 overlying the surface of the melt 21 and the area immediately above the unmelted batch where the electrode arm would be exposed to air which is highly oxidizing. The cooling means shown in the drawings comprises a cooling jacket 30 through which a cooling fluid, such as air or water, is circulated through an inlet pipe 32 and out of an outlet pipe 34. The flow of cooling fluid through this melt line vicinity cooling means is controlled to mainain the temperature of the electrode arm in this vicinity at a temperature below that at which it will rapidly oxidize in an oxidizing atmosphere such as air.

FIG. 4 is an enlarged partial view of FIG. 2 illustrating the assembly of one of the primary electrodes 4. The essentially vertical upper electrode rod or arm 28 is further cooled in addition to the cooling provided by the cooling means 30 by a cooling jacket 41 extending down the center for most of the length of electrode arm 28. The cooling jacket 41 comprises an outer jacket 43 having an outlet 42 and an inner member or pipe 40 extending down the center for most of the length of the jacket 43. The cooling jacket 41 can be made from any material compatible with the material used for the electrode arm 28. When molybdenum is used for the arm 28 it is preferred to make the cooling jacket 41 from copper. Any cooling fluid can be circulated through the cooling jacket 41 such as air, water, etc. The purpose for this cooling jacket 41 is to maintain the temperature of the rod or arm 28 below that at which it will readily oxidize in air. The arm 28 is heated not only by the temperature from the melt in the furnace but also due to its resistance to the large amount of electrical current flowing therethrough. Since the arm below the melt line 21 is protected from oxidation by the molten material 20, the cooling is only for the exposed portion of the arm at and above the melt line 21. Thus, the amount that the cooling jacket 41 extends below the melt line 21 is not critical once the above described requirement is met. It is not necessary to cool the electrode elbow 26, the electrode arm 24, or the electrode tip 18.

The cooling means 30 can be fabricated from any material suitable for the conditions and compatible with the melt 20 with which it is in contact. When melting glass or refractory compositions it is preferred to use copper or stainless steel for the jacket 30 and for the inlet and outlet parts 32 and 34.

FIG. 5 shows a preferred embodiment of the present invention which is somewhat different from the embodiment shown in FIG. 2. In this embodiment a minimum amount of each primary electrode is located below the melt line 21. Each primary electrode has a generally horizontal member 39, which preferably is a refractory metal hollow rod, such as molybdenum, of sufficient diameter and wall thickness to support itself and the remainder of the electrode. The electrode member 39 is threaded into, welded to, or otherwise attached to an elbow 36 which can be a refractory metal, copper, or other suitable material. To remove some of the heat due to its electrical resistance, the electrode member 39 can be water cooled in a similar manner as the electrode arm 28 shown in FIG. 2, as will be seen later in the description of FIG. 6. Also fastened to elbow 36 is an electrode arm or rod 28 which in this embodiment is not water cooled except for the cooling provided by the cooling means 30 at the melt line vicinity. Other features of this embodiment are like the corresponding features of the embodiment shown in FIG. 2 and are numbered correspondingly.

It is also feasible to modify the embodiment shown in FIG. 5 by shortening the electrode arm 39 slightly, by attaching an elbow, like the elbow 26 shown in FIG. 4, onto the end of electrode arm 28, and then using a short generally horizontal electrode arm, like electrode arm 24 shown in FIG. 4, to make up for the length that the electrode arm 39 was shortened. While such a modification places more electrode mass below the melt line 21 then the embodiment shown in FIG. 5, it does have less electrode mass beneath the melt line 21 than the embodiment shown in FIGS. 2 and 4.

FIG. 6 shows the apparatus used to mount and support each primary electrode and to connect the electrical power source to each of the electrodes. The apparatus shown in FIG. 6 is equipped for the electrode configuration shown in FIG. 5. The electrode arm 39 is bolted to a steel saddle member 44 using saddle clamp 46 and bolts 48. The steel saddle member 46 is in turn welded to a steel bar 50 which in turn is bolted by bolts 54 to a conventional DODGE TAKE-UP 52. By using this device and by rotating the hex nut 53 on the device one way or the other, the electrode arm 39 can be moved back and forth laterally to adjust the amount of space between the surface of the electrode tip 18 and the opposing surface of the outlet member 6 (see FIG. 5) to produce the desired operating and melting conditions and efficiency. The DODGE TAKE-UP device is in turn bolted to a mounting plate 55 by bolts 57. The mounting plate 55 is mounted to a lower supporting plate 56 in a pivotal manner by means of a bearing or bushing 58 welded to plate 55 and a clevis 60 welded to plate 56 attached to the bearing 58 by a pin 62 in a conventional manner. On the other end of plate 55 an adjustment threaded bolt 64 passes through a hex nut 66 welded to plate 55 and bears against a wear plate 68 welded to plate 56. By rotating the adjustment bolt 64 in one direction or another the angle that electrode arm 39 makes with the horizontal can be manipulated, thus providing adjustment for aligning the surface of the electrode tip 18 to be parallel with the opposing outer surface of the outlet member 6 (see FIG. 2). Lower mounting plate 56 is in turn bolted to an electrically insulated pad 74 by bolts 72. The electrically insulating pad 74 is in turn fastened to the floor or to other structural members in a conventional manner.

Referring to FIGS. 6 and 7, the electrical power is fed to each electrode arm 39 by copper or other electrically conducting metal buss bars 75 from electrical cables 76 mounted thereto in a conventional manner. The buss bars 75 are mounted to electrode arm 39 by electrically conducting saddle members 73 and bolts 77. A portion of one of the buss bars 75 is removed in FIG. 6 to better illustrate other features of the mounting assembly.

The means used in the present invention to maintain the temperature of the primary electrodes in the vicinity of the melt line 21 at a temperature below that at which it would rapidly oxidize in an oxidizing atmosphere is shown in cross section in FIG. 8. The means 30 shown is a water cooling jacket preferably made of copper or stainless steel and preferably comprises a one piece cast or machined cavity 78 to which is welded, silver soldered, or otherwise suitably attached, a top plate 80 along the circumferences 82 and 84. The top plate 80 has two threaded openings 86, one of which is connected to the inlet 32 and to a pipe 83 for directing the cooling water towards the bottom of the cavity 78, and the other of which is connected to the outlet 34. The outside diameter of the electrode arm 28 is preferably smaller than the inside diameter of the cooling means 30 in order to allow the cooling means 30 to be readily removed from arm 28 when changing primary electrodes. Any molten material entering between the electrode member 28 and the inside surface of the cooling means 30 will be immediately solidified to form a seal. The total electrode contacting height or length of the cooling means 30 will depend upon each particular operation, e.g., the type of material being melted, the temperature of the melt 22 in the furnace, and the thickness of the layer of unmelted batch 22. In a typical glass melting operation melting a glass composition suitable for fiberizing, a total electrode contacting height of about 6 inches is satisfactory for the cooling means 30. When melting more refractory materials at higher melt temperatures it may be necessary to increase the effective contact height or length of the cooling means 30. While joints on the cooling means 30 below the melt line are permissible they are not preferred due to the greater possibility of disruptive leaks in joints in a more hostile environment.

A still further embodiment of the present invention is shown in FIG. 9. Except for the configuration of the primary electrodes, this embodiment is like the embodiment shown in FIGS. 2 and 5 and thus like members are numbered correspondingly. In this embodiment the electrode arm 28 extends directly from an elbow member 37 to the electrode tip member 18. While this primary electrode configuration places a larger percentage of the electrode beneath the melt line 21 than the configuration shown in FIG. 5, it does reduce the complexity of the total primary electrode member. In this configuration, since the electrode member 28 is passing through the melt line 21 at a much smaller angle to the horizontal than the configuration shown in FIGS. 2 and 5, it is necessary to substantially increase the electrode contacting length of cooling means 30.

The primary electrode configuration shown in FIGS. 2, 5, and 9 are only a few of the many configurations that could be used according to the present invention. The only requirement of the present invention is that the primary electrodes be mounted and arranged in such a manner that they do not pass through a wall or the bottom of the melting furnace at a point below the melt line and that the primary electrodes be equipped with means to maintain the temperature of the primary electrodes in the vicinity of the melt line at a temperature below that at which the primary electrode material would rapidly oxidize in an oxidizing atmosphere. This temperature of course will vary depending upon the material used for the primary electrodes.

Wherever the term primary electrode or electrodes are used in this Specification they are not to be confused with starting or dipping electrodes used in the prior art. The starting or dipping electrodes can be eliminated by using other means of initially heating the glass batch or cullet to melt a sufficient amount around the primary electrode tips and the electrically conducting member to reduce the resistance of the melt to a point at which the primary electrodes can function in their intended manner. Thereafter, additional batch is added to the furnace in such a manner as to distribute the batch evenly over the surface of the melt to form an insulative layer and to renew the batch at a rate substantially the same as the rate at which the melt is withdrawn from the furnace through outlet member 6 in a conventional manner.

Using the present invention one or more primary electrodes can be replaced without cooling down the furnace by merely turning off the power to the primary electrode to be replaced, hoisting out the electrode and the electrode mounting assembly, disconnecting the defective or worn electrode or electrode tip member and replacing it with a new electrode or new tip member, hoisting the new or repaired primary electrode and electrode mounting assembly back into place, and turning the power back on to the new or repaired primary electrode. With the present invention this normally requires about one hour or less per primary electrode as compared with about 24 to 48 hours required to cool down and replace a primary electrode in the prior art furnaces. In addition, the electrodes of the present invention, the refractory lining, and the furnace shell have a much longer life than the furnaces of the prior art because of the absence of interaction of the furnace walls or bottoms with the electrodes. Furthermore, inert or reducing gasses necessary for the protection of the primary electrodes in the prior art furnaces are not required in the furnace of the present invention. Finally, the furnace of the present invention is much safer than those of the prior art because the danger of electrical shorts between the primary electrodes and the furnace shell are avoided, as are the dangers of the melt leaking through primary electrode openings in the shell and lining and running out below the furnace.

In describing the invention certain embodiments have been used to illustrate the invention and the practice thereof. However, the invention is not limited to these specific embodiments as other embodiments and modifications within the spirit of the invention will readily occur to those skilled in the art on reading this Specification. The invention is thus not intended to be limited to the specific embodiments disclosed, but instead is to be limited only by the claims appended hereto.

We claim:
1. In a melting furnace comprising:
   a. a vessel for containing molten material and unmelted batch on the surface of the molten material forming an interface,
   b. an electrically conducting member located within said vessel, and
   c. at least two electrically conducting primary electrodes made from a refractory metal highly susceptible to oxidation at elevated temperatures in an oxidizing atmosphere inside said vessel having their tips spaced radially about said electrically conducting member, the improvement comprising:
   d. each primary electrode having a portion thereof exposed through the top surface of the molten material to the unmelted batch and other environment adjacent to the top surface of the molten material, and
   e. each primary electrode having means around its exterior surface located where said electrode passes through said interface for cooling the electrodes in this vicinity to a temperature below that at which the material used to form said electrodes would rapidly oxidize in an oxidizing atmosphere.

2. A melting furnace as defined in claim 1 wherein said cooling means is a fluid cooling means.

3. A furnace as defined in claim 2 wherein said primary electrodes are equipped with additional cooling means sufficient to maintain the temperature of said portion of the electrode extending out of and beyond the top surface of the melt below a temperature at which the material used to make the electrode would rapidly oxidize in an oxidizing atmosphere.

4. A furnace as defined in claim 3 wherein said primary electrodes are made from a refractory metal material selected from the group consisting of molybdenum, tantalum, tungsten, and alloys thereof.

5. A furnace as defined in claim 2 wherein each electrode comprises a generally horizontal electrode member extending out over an upper edge of the furnace and the melt therein a substantial distance, a generally vertical electrode member connected to said generally horizontal electrode member and extending from a point above said melt down through the upper surface of said melt and to a point in said melt adjacent said electrically conducting member.

6. A furnace as defined in claim 2 further comprising mounting means for each of said primary electrodes, said mounting means comprising means for moving the primary electrode such that the distance between a tip of said electrode and an outer opposing surface of said electrically conducting member can be changed.

7. A furnace as defined in claim 7 wherein said mounting means further comprises means for pivoting said electrode mounting means about a point on said electrode mounting means to adjust the parallelism between a surface of said electrode tip and the opposing outer surface of said electrically conducting member.

8. A furnace as defined in claim 2 wherein there are three primary electrodes.

9. A furnace as defined in claim 2 wherein the axis of that portion of the primary electrode extending from the electrode mounting means and the tip of the electrode is essentially a straight line.

10. A furnace as defined in claim 2 wherein said electrically conducting member is an outlet through which molten material passes to exit the furnace.

* * * * *